(12) United States Patent
Mahar et al.

(10) Patent No.: US 11,245,950 B1
(45) Date of Patent: Feb. 8, 2022

(54) LYRICS SYNCHRONIZATION

(71) Applicant: Amazon Technologies, Inc., Seattle, WA (US)

(72) Inventors: Matthew Dominick Mahar, San Francisco, CA (US); Emanuele Coviello, San Francisco, CA (US); Robert Richard Morse, Seattle, WA (US); Sachin Gupta, Bengaluru (IN); Jayashree Rajagopalan, Bangalore (IN)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/393,434

(22) Filed: Apr. 24, 2019

(51) Int. Cl.
| | |
|---|---|
| *H04N 21/43* | (2011.01) |
| *G06F 16/683* | (2019.01) |
| *H04N 21/8547* | (2011.01) |
| *H04N 21/488* | (2011.01) |
| *G10L 15/26* | (2006.01) |

(52) U.S. Cl.
CPC ....... *H04N 21/4307* (2013.01); *G06F 16/685* (2019.01); *G10L 15/26* (2013.01); *H04N 21/4884* (2013.01); *H04N 21/8547* (2013.01)

(58) Field of Classification Search
CPC ........... H04N 21/4307; H04N 21/4884; H04N 21/8547; G06F 16/685; G10L 15/265
See application file for complete search history.

(56) References Cited

U.S. PATENT DOCUMENTS

| | | | | |
|---|---|---|---|---|
| 8,304,642 | B1* | 11/2012 | Bryan | G10H 1/0008 84/601 |
| 10,692,497 | B1* | 6/2020 | Muske | G10L 15/26 |
| 2013/0124984 | A1* | 5/2013 | Kuspa | H04N 21/4307 715/255 |
| 2015/0012867 | A1* | 1/2015 | Yoon | G06F 40/232 715/773 |
| 2015/0215564 | A1* | 7/2015 | Robinson | H04N 21/4307 348/468 |
| 2016/0014438 | A1* | 1/2016 | Xiong | H04N 21/812 725/32 |
| 2016/0335347 | A1* | 11/2016 | Yl | G10L 25/03 |
| 2018/0144747 | A1* | 5/2018 | Skarbovsky | G06F 40/232 |

FOREIGN PATENT DOCUMENTS

WO    WO-2007018842 A2 *   2/2007    ........... G06F 40/232

* cited by examiner

*Primary Examiner* — Sunghyoun Park
(74) *Attorney, Agent, or Firm* — Kilpatrick Townsend & Stockton LLP

(57) ABSTRACT

Techniques for identifying and correcting synchronization errors for a media file are described herein. A first file that includes a first set of words comprising lyrics of a media file may be maintained. One or more portions of the media file that represent vocal audio may be separated from other portions of the media file that represent instrumental audio by a computer system. A second file may be generated based at least in part on using an automated speech recognition on the separated one or more portions of the media file. The second file my include time stamps for a second set of words comprising the lyrics in the separated one or more portions of the media file. The first file may be modified with an offset time value that is determined by aligning the first set of words with the second set of words.

17 Claims, 8 Drawing Sheets

LYRICS SYNCHRONIZATION

BACKGROUND

Some digital music content may include lyric sheets that list the lyrics corresponding to the music content. When played, a user can read the lyric sheet while listening to the content. Some music content may be presented via other channels such as via a streaming media device. In such cases, lyric sheets may not be offered. Current media content may include lyric files which can be used in an attempt to present synchronized lyrics. However, there may be various different versions of the music content and the corresponding lyric files can include synchronization errors.

BRIEF DESCRIPTION OF THE DRAWINGS

Various embodiments in accordance with the present disclosure will be described with reference to the drawings, in which.

DETAILED DESCRIPTION

Figure 1:
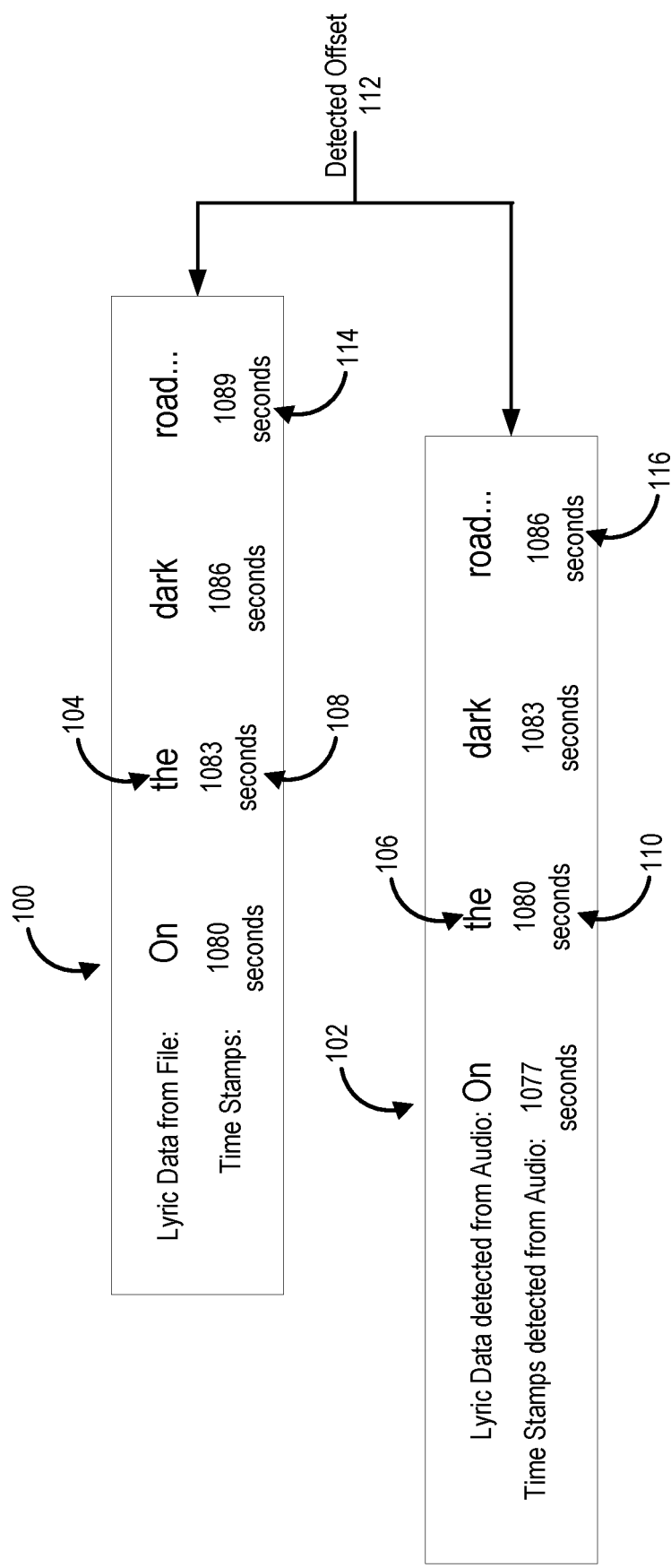
FIG. 1 illustrates an example of a detected offset for an automated synchronization feature, in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described herein provide for an automated synchronization feature for identifying and correcting synchronization errors between audio for a media file and corresponding lyrics for the media file. For example, a media file may correspond to an audio recording of a song that includes vocal and instrumental portions. An associated lyric file may be utilized by a computer device to simultaneously display or present text which corresponds to lyrics of the vocal portion of the audio recording as the audio recording is played by the computer device. Lyric files may allow users to identify the specific words of the audio recording. However, different versions or transcoding of media files and audio files may result in non-synchronization between the audio as it is played and the lyrics that are presented for the audio such that a user is unable to identify the specific words or follow along with the song. In embodiments, a service provider computer implementing the automated synchronization feature may identify and correct synchronization errors between lyric files and associated media files. In accordance with at least one embodiment, the service provider computer may be configured to identify and correct text or language errors present in a lyric file for an associated media file such as by identifying misspelled words, missing words, or incorrect words and modifying the lyric file with transcribed words generated from the vocal portion of the media file.

In embodiments, the service provider computer may modify a lyric file provided by a third party or the author of the media file (e.g., a content creator) to correct synchronization errors or incorrect text or language errors between the audio of the media file and the text and presentation of the lyrics of the lyrics file. In accordance with at least one embodiment, the automated synchronization feature implemented by the service provider computer may be configured to utilize a lyric file from an entity (e.g., third party or content creator) that includes time stamps (e.g., a start time and end time for an utterance of a word in the media file) for each word of the vocal portion of the media file as well as the words that comprise the lyrics for the media file to identify synchronization or language errors. For example, a given lyric file may include data that identifies that the lyrics include "In the room . . . " with corresponding timestamps for each word including 0.580 milliseconds, 0.600 milliseconds, and 0.620 milliseconds, respectively. The automated synchronization feature described herein may utilize the media file and an algorithm to separate the vocal portion of the media file from the instrumental portion of the media file. In embodiments, the lyric file may be maintained by the service provider computer implementing the automated synchronization features described herein and not obtained from a third party.

In embodiments, the service provider computer may utilize the separated vocal portion of the media file and speech recognition to generate a new file that includes transcribed words in the vocal portion of the media file as well as time stamps that are generated as the transcribed words are detected. The automated synchronization feature may include comparing the lyric file (first file) with the generated file (second file) to identify an offset between the time stamps as well as any language or text errors. For example, the specific transcoding of a song that includes the above noted lyrics may actually be presented such that the time stamps for "In the room . . . " correspond to 0.540 milliseconds, 0.560 milliseconds, and 0.580 milliseconds, respectively. In response to identifying the synchronization errors the service provider computer may modify the timestamps of the lyric file for the media file such that when they are presented or otherwise consumed simultaneously the presentation of the lyrics of the lyrics file will be synchronized with the audio and vocal portion of the media file. In accordance with at least one embodiment, language errors or text errors that can be identified and corrected by the automated synchronization feature may include identifying a more common word to be utilized instead of a less common word.

In accordance with at least one embodiment, the service provider computer may modify a lyric file provided by an entity to correct synchronization errors in cases where the lyric file includes allegedly synchronized words but lacks corresponding time stamps. In such cases the service provider computer implementing the automated synchronization feature may align words between a generated file (e.g., transcribed from the separated vocal portion of a media file as described above) and the provided lyric file to synchronize the audio of a media file and the lyric file to correct any identified synchronization errors. For example, by modifying the lyric file by aligning the words of the lyric file to more closely match the words of the generated file an offset is introduced such that any identified synchronization errors are resolved. In accordance with at least one embodiment, an N-gram algorithm may be utilized to align the words between the files to resolve any identified synchronization errors. For example, a 3-gram match comparison indicating that the automated synchronization feature requires a minimum of 3 matching words between the lyric file and generated file to align and resolve synchronization errors. In some embodiments, the service provider computer may align the first word and last word of the lyric file and generated file or of each line of lyrics in the lyric file and generated file to align the words and identify synchronization errors. The automated synchronization feature may also be used to identify and correct synchronization errors and language or text errors for lyric files that include unsynchronized lyrics without time stamps. In accordance with at least one embodiment, a large identified offset synchronization error for a lyric file may be flagged, tagged, or otherwise marked or indicated for review by an operator associated with the service provider computer implementing the automated synchronization features. For example, an identified offset may be compared to a threshold and if the offset exceeds the threshold, the lyric file, particular word, and/or time stamp may be marked or tagged for further review by an operator for manual correction.

In accordance with at least one embodiment, the automated synchronization feature may include generating a value that represents a confidence in the transcribed word included in the generated file using the separated vocal portion of a media file. The automated synchronization feature may also generate a value that represents a confidence between the overall offset between the lyric file and generated file for corresponding time stamps indicating that an offset would correct the synchronization error between the presentation of the audio and the lyrics of the lyric file. In accordance with at least one embodiment, the service provider computer implementing the automated synchronization feature may utilize a threshold with which to compare the value that represents confidence in the transcribed word or the value that represents the confidence in the identified offset to provide the files to an operator for manual review and correction. For example, if a given value of confidence exceeds the threshold, then the lyric file may be modified to automatically correct the synchronization error; otherwise, the files may be transmitted to a computer device associated with an operator who may manually review and correct the error. In accordance with at least one embodiment, the automated synchronization feature may correct a synchronization error that the system is confident exists no matter the comparison of the duration of the de-synchronization as compared to a threshold. In embodiments, the service provider computer implementing the automated synchronization feature may utilize a statistical determination to identify the confidence in the detected offset of timestamps between files to synchronize or modify a lyric file.

In accordance with at least one embodiment, the automated synchronization feature may include generated a lyric file for a media file where no third party or previously generated lyric file exists for the media file. In embodiments, the service provider computer may receive a media file, detect and separate the vocal portions from the instrumental portions of the media file, and transcribe the words included in the separated vocal portions as well as generate time stamps for the transcribed words. The service provider computer may utilize a machine learning algorithm that is trained using data sets derived from other transcribed or generated files that are synchronized with media files to detect and separate the vocal portions of the media file as well align the transcribed words with the audio detection of the words in a media file. In embodiments, the machine learning algorithm may be trained using lyric files with time stamps or using lyric files that contain vocal audio separated from the instrumental portions of a media file with corresponding time stamps. The processes and systems described herein may be an improvement on conventional synchronization error and correction methods for identifying and correcting errors between lyrics and media files. For example, conventional methods for identifying and correcting synchronization errors include manually identifying errors and correcting errors between each media file and lyric file.

As many different versions or transcoding of songs can exist the manual identification and correction of synchronization errors can be a time consuming process that still results in errors. As indicated above, lyrics files provided by entities such as third parties or content creators can include synchronized lyrics with time stamps, synchronized lyrics, or just unsynchronized lyrics. The quality and coverage of each type of lyric file provided by third parties can vary greatly and further complicates the manual correction process of identifying and correcting synchronization errors between a media file and a lyric file. Further, multiple language interpretations of a song may exist and synchronization errors may exist between each language lyric for and corresponding language interpretation of a song that may take even longer to identify and correct as a translator may need to be utilized in the synchronization process. As music catalogs increase in size bottlenecks may occur in the manual identification and correction of synchronization error processes. However, the methods and systems described herein utilize an identification and correction process that can more efficiently identify and automatically correct lyric files by applying offsets to times tamps or aligning words between a lyric file and generated file as well as correct mislabeled, transcribed, or missing words such that the lyric file and media file may be synchronized for simultaneously presentation.

FIG. 1 illustrates an example of a detected offset for an automated synchronization feature, in accordance with at least one embodiment. FIG. 1 includes a lyric file 100 and a generated file 102 as well as associated lyrics 104 and 106 as well as time stamps 108 and 110. In embodiments, the lyric file 100 may be provided by a third party and include lyrics 104 that correspond to the words included in the vocal portion of a media file (e.g., "On the dark road . . . "). The lyric file 100 may include time stamps 108 that correspond to when the corresponding word would be presented when presented simultaneously with the media file. For example, if a user were to play a media file with lyrics that correspond to the lyrics "On the dark road . . . " each word would be presented as the media file played at the corresponding time stamp 108. As described herein, lyric files provided by third parties may include synchronized lyrics similar to the lyrics 104 but absent the time stamps 108 as well as unsynchronized lyrics. In embodiments, the automated synchronization features described herein may utilize a lyric file and the corresponding data included in a lyric file whether it include synchronized or unsynchronized lyrics as well as time stamps to identify and correct synchronization errors between said lyric file and an associated media file.

Figure 2:
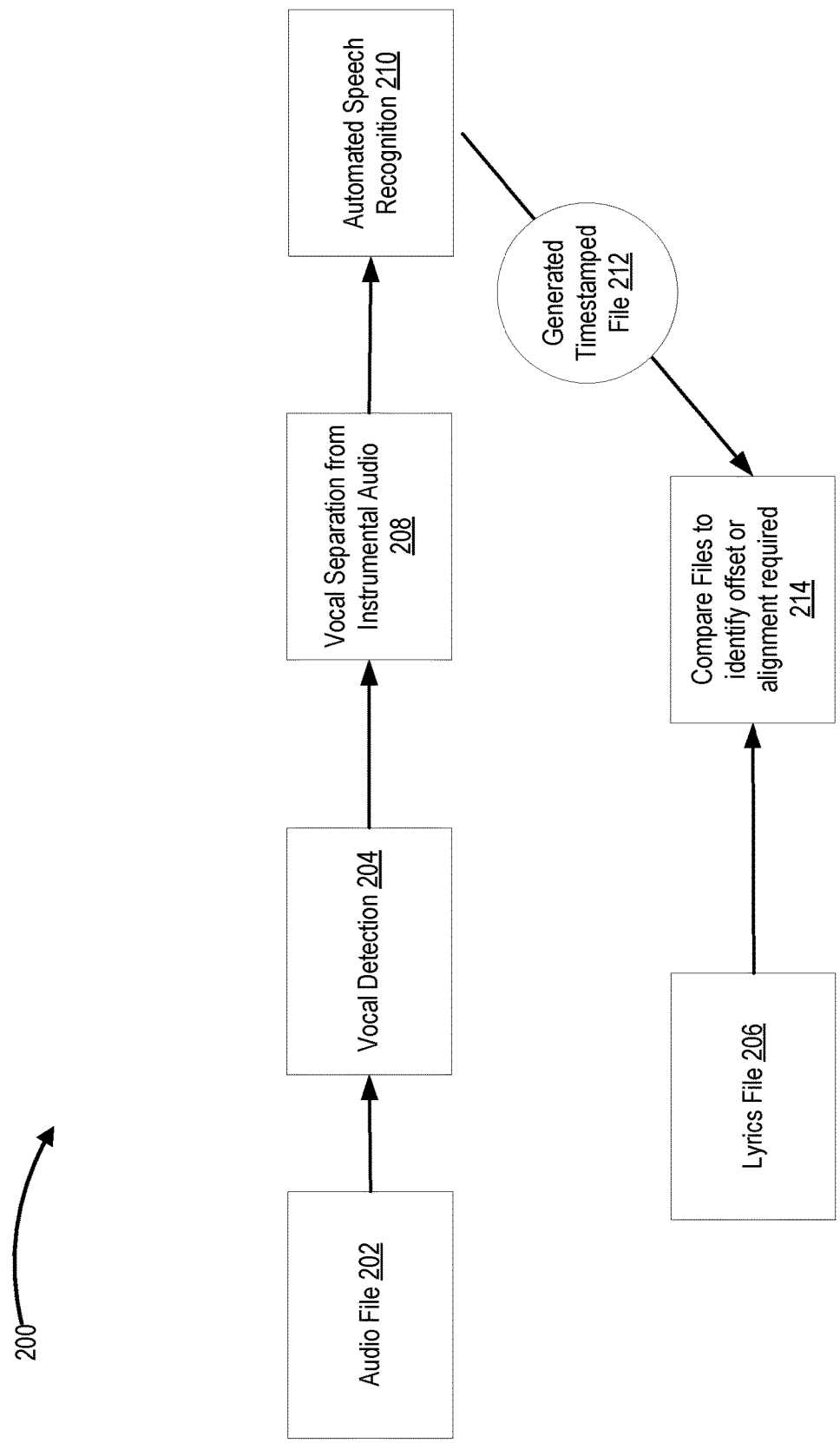
FIG. 2 illustrates an example workflow for an automated synchronization feature, in accordance with at least one embodiment.

The generated file 102 may include lyrics 106 that are transcribed from a separated vocal portion of the media file as described herein and in more detail with reference to FIG. 2. In embodiments, each word that comprises the lyrics 106 are transcribed using speech recognition or speech recognition algorithms implemented by the service provider computer that utilize the vocal portions of an audio file or media file to detect and transcribe the words that comprise the lyrics as well as generate a time stamp (e.g., time stamps 110). The time stamps 110 correspond to a detection by the speech recognition algorithm of the utterance of each word that comprises the lyrics 106. In accordance with at least one embodiment, the generated file may include one or more data objects for each detected word detected by the speech recognition. Each data object may include a start time that corresponds to when the utterance of the word is detected, an end time that corresponds to when the utterance of the word is no longer detected, a transcription of the detected word, a value that represents a confidence in the transcription of the detected word, and a type of word such as a pronunciation. In embodiments, the service provider computer implementing the automated synchronization feature may flag or tag certain words which is also indicated in the data object of the generated file for further inspection or correction by an operator.

The service provider computer may utilize a threshold to compare the value of confidence in the transcription to flag or tag a transcribed word for further operator review such as when the value falls below a certain threshold indicating that the speech recognition may not have transcribed or understood the word uttered at the corresponding time stamp. FIG. 1 also includes a detected offset 112 that represents the offset between the time stamps 108 of the lyric file 100 and the time stamps 110 of the generated file 102. As described herein, due to different transcriptions, versions, or other factors the audio playback of an audio portion of a media file or vocal portion of a medial file may introduce desynchronization errors with an associated lyric file such as lyric file 100. When this occurs an unmodified or uncorrected lyric file that is presented simultaneously or used simultaneously with a media file may result in words that correspond to the lyrics being presented incorrectly or at such a latency that a user is unable to utilize or understand the words as visually presented with the words that are being audibly presented by a device. In embodiments, the service provider computer may compare the lyric file 100 and generated file 102 to identify language or text errors as well as the time stamps to identify an offset.

For example, if one of the lyrics 106 was different from a lyric 104 than the service provider computer could modify the lyric file 100 to correct a spelling mistake, introduce a word as well as the associated time stamp for the word in the correct position for a missing word, or replace a word that was incorrectly included in the lyric file but correctly detected in the generated file. As illustrated in FIG. 1, the detected offset 112 may correspond to three seconds between the files (114 and 116). In embodiments, the service provider computer may generate an time offset (offset) by determining a mean or median offset between the time stamps 108 and 110 of the files 100 and 102. In response to identifying an offset between the time stamps 108 and 110 of the lyric file 100 and generated file 102, the service provider computer may modify the lyric file 100 by applying the determined offset to the time stamps 108 thereby resolving the synchronization error between the lyric file 100 and the corresponding media file. If no offset is detected then the lyric file 100 may be flagged or otherwise marked as synchronized with the corresponding media file. In embodiments, the service provider computer may maintain a threshold of time that represents the offset that a content streamer, content creator, or user would find acceptable for applying an offset correction. For example, the service provider computer may only apply a correction using a time offset when the detected offset 112 is greater than 500 milliseconds. In embodiments, the service provider computer, content streamer, content creator, or user may specify the threshold of time for applying offsets.

FIG. 2 illustrates an example workflow for an automated synchronization feature, in accordance with at least one embodiment. FIG. 2 includes workflow 200 that includes an audio file 202 being received by service provider computer (not pictured) implementing the automated synchronization features described herein. In embodiments, a media file such as a movie, streaming music, an MP3, or other audio file may be received and analyzed to identify and correct synchronization errors between the media file and an associated lyric file. In the workflow 200 at 204 vocal detection of the vocal portions of the audio file 202 is performed by the service provider computer. In accordance with at least one embodiment, the vocal portions of the audio file 202 may be detected 204 based on time stamps included in an associated lyric file, such as a lyrics file 206. In some embodiments, the vocal portions of the audio file 202 may be detected 204 based on first frequencies associated with the vocal audio (vocal portions) and second frequencies associated with the instrumental audio.

The workflow 200 includes separating the vocal audio from the instrumental audio at 208. In embodiments, separating the vocal audio from the instrumental audio can include separating the vocals in a media file from the accompaniment of a polyphonic recording. By separating the vocal audio from the instrumental audio the service provider computer can use speech recognition to achieve a more accurate transcription and time stamp generation for a resulting generated file for the media file or polyphonic recording. One characteristic that is common to several music genres is repetition as vocals (possibly different) are overlaid over a repetitive structure through the length of a recording. In embodiments, the service provider computer implementing the automated synchronization feature may utilize a machine learning algorithm or neural network that is trained to predict two-soft masks that can recover estimates for the magnitude spectrograms of vocals and accompaniment (instrumental portions) from the magnitude spectrum of the mixed signal included in an audio file or polyphonic recording. For example, assuming that a song waveform $s(t)=u(t)+a(t)$ is given by a mixture of vocals waveform $u(t)$ and an accompaniment waveform $a(t)$. Generally, audio files are given in a mixed $s(t)$ and the service provider computer is determining an estimate $\hat{u}(t)$ of the vocals or vocal portion.

In embodiments, the neural networks or machine learning algorithm may be trained using a dataset of songs with corresponding vocals and accompaniments $D=\{(s, u, a)\}$, that can be used to compute the corresponding spectrograms $S(t,f)$, $U(t,f)$ and $A(t,f)$. The two soft-masks of the neural network $m_V(t,f)$ and $m_A(t,f)$ to determine estimates for the magnitude spectrograms of vocals and accompaniment from the magnitude spectrogram of the mixed signal $|S(t,f)|$, i.e.:

$$|\hat{U}(t,f)|=m_U(t,f)\cdot|S(t,f)|$$

$$|\hat{A}(t,f)|=m_A(t,f)\cdot|S(t,f)|$$

where the multiplication is element-wise. The parameters of the neural networks or machine learning algorithm are trained to optimize a loss:

$$L=\Sigma D\ l(m_U(t,f)\cdot|S(t,f)|-|U(t,f)|)+l(m_U(t,f)\cdot|S(t,f)|-|(U)(t,f)|)$$

where l is an appropriate matrix norm such as the $L_{1,1}$ norm. In embodiments, the neural networks or machine learning algorithms may utilize self-attention subnets to make use of repetitive long-term structures in music or songs such as drum beats or chord repetitions. In accordance with at least one embodiment, the neural networks or machine learning algorithms can be trained using a non-separated version and a separated (e.g., into vocal and instrumental portions) where that correspond to mixed signal s(t) and the accompaniment a(t) that can be used to determine an approximation to the magnitude spectrogram of the vocal portion to train the networks or algorithm i.e., $|\hat{U}(t,f)|=|S(t,f)|-|A(t,f)|$.

The workflow 200 includes analyzing the vocal separated portions 208 of the audio file 202 by the service provider computer using speech recognition or automated speech recognition 210. In embodiments, the speech recognition algorithm 210 may generate a time stamped file 212 (generated file or second file) that includes transcribed words included in the vocal separated portions 208 as well as time stamps that correspond to the time period of utterances of each transcribed word included in the vocal separated portions 208. The generated file 102 may be an example of the generated timestamped file 212. The workflow 200 may include comparing the files to identify an offset or alignment required at 214 to correct any identified synchronization errors between the files 212 and 206. In cases where the lyrics file 206 includes synchronized words and time stamps the generated timestamped file 212 may be used by the service provider computer to identify a potential offset to resolve any discrepancies between time stamps of lyrics of the files 212 and 206. If an offset to the time stamps of the lyrics file 206 is required then the service provider computer may be configured to apply the offset to each time stamp included in the lyrics file 206 to synchronize the audio file 202 and corresponding lyrics file 206.

As described herein, the service provider computers may also identify language or text errors included in the lyrics file 206 by comparing the transcribed words included in the generated timestamped file 212 to the words in the lyrics file 206. For example, the third party lyrics file may include misspelled words, include missing words that were detected and transcribed by the automated speech recognition 210, include incorrect words, or include phrases that are meant as shorthand for repeating choruses or other phrases such as "repeat x 10." The language or text errors can be corrected by the service provider computer modifying the text of the lyrics included in the lyrics file 206 using the text or words included in the generated timestamped file 212. In embodiments, the service provider computer may apply a fixed offset to the time stamps of the lyrics file 206 to correct the synchronization error. The lyrics provided by in the lyrics file 206 may be represented as $X=\{(x_i, a_i)\}$, where $x_i$ is an n-gram and $a_i$ is a corresponding time stamp. In embodiments, the lyrics file 206 may be provided by a third party or maintained by the service provider computers implementing the automated synchronization features described herein. The transcribed lyrics included in the generated timestamped file 212 may be represented as $Y=\{y_i, b_i)\}$, where $y_i$ is an n-gram and $b_i$ is a corresponding time offset from the beginning of the audio for the audio file 202.

In embodiments, the service provider computer may match anchor n-grams from X to n-grams from Y and determine an overall offset ô from the offsets between the individual anchors. If M is a sequence of matches, where the k-th match in the sequence m(k) (i, j, s, t) is defined by the indices i, j of the two tokens (from X and Y, respectively) it matches, the similarity s between the two tokens, and the time offset $t=a_i-b_j$ between the two time stamps. The service provider computers may use any suitable definition of similarity that is suitable for the text in the files such as a Levenshtein similarity. In embodiments, the service provider computer may find the largest number of matches M* with the overall largest cumulative similarity over the matched tokens using dynamic or iterative programming. In accordance with at least one embodiment, the service provider computer may impose certain constraints such as a given token in X can be matched to at most a single token in Y, and vice-versa. Directionality may also be imposed such that if the i-th token in X matches the j-th token in Y, the next i+1-th token in X can only match the following tokens j'>j in Y. The overall offset can be determined as a function of the best sequence matches (i.e., ô=f(M*)). In some embodiments, the service provider computer may also determine the offset by only identifying the first match m(1)∈M*. The time stamps in the lyrics file 206 may be adjusted by the determined offset where the time stamps X for the audio recording Y as $X_Y=\{(x_i, a_i-\hat{o})\}$. In embodiments, the service provider computer may determine a confidence that all matches are affected by a fixed offset using a one sample t-test. In embodiments, if the confidence is low the lyric file 206 may remain unadjusted via a fixed offset.

Figure 3:
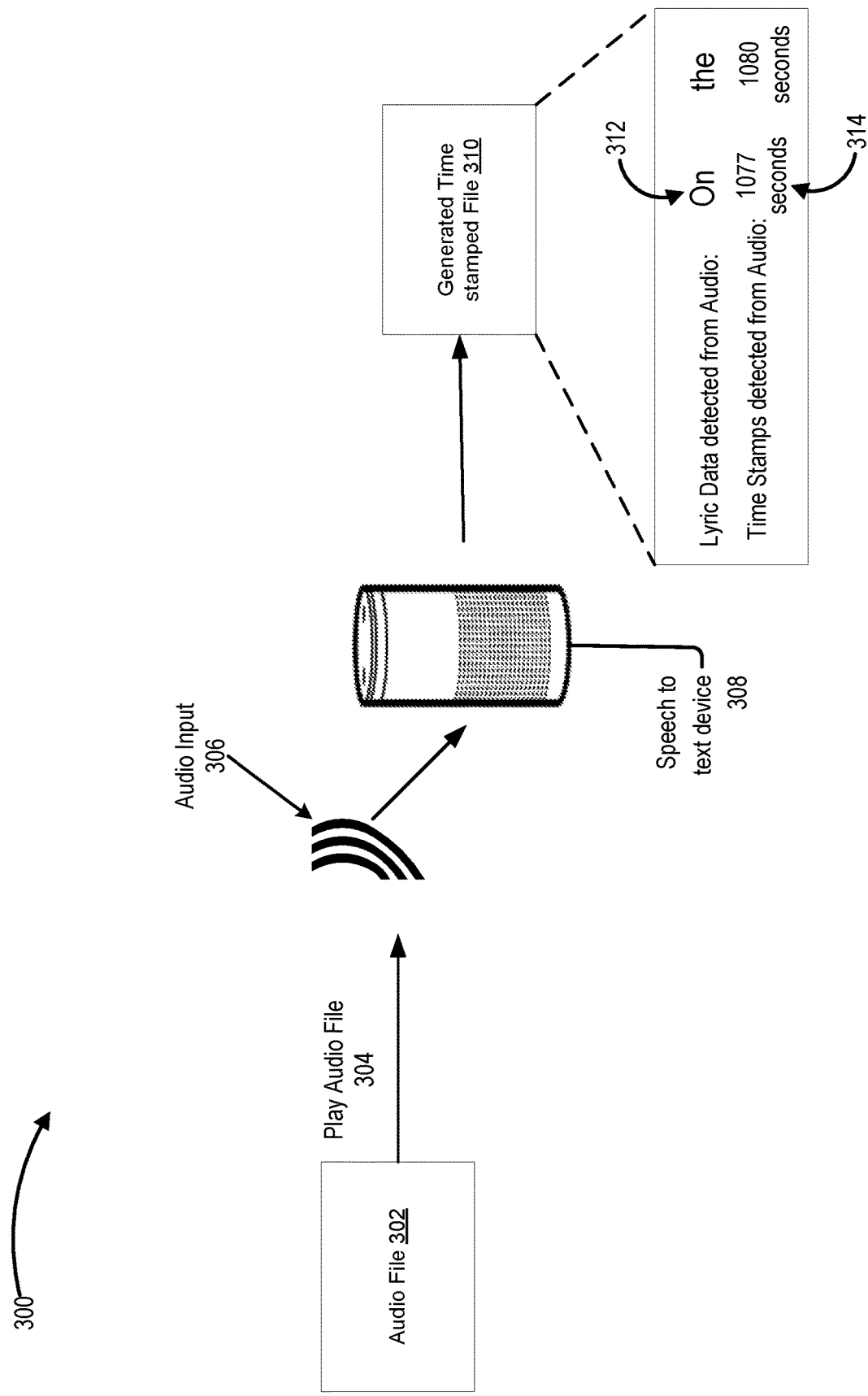
FIG. 3 illustrates an example workflow for an automated synchronization feature that includes a speech to text device, in accordance with at least one embodiment.

FIG. 3 illustrates an example workflow for an automated synchronization feature that includes a speech to text device, in accordance with at least one embodiment. The workflow 300 includes an audio file 302 being played 304 to generate audio input 306 that is received by a speech to text device 308. In embodiments, the audio file 302 may be an example of a media file such as a song in moving picture experts group layer-3 audio (MP3) format. In accordance with at least one embodiment, the speech to text device 308 may be configured to receive the audio input 306, separate the vocal portions from the instrumental portions included in the audio file 302, and generate a time stamped file 310. The generated time stamped file 310 may include one or more words 312 and time stamps 314 that correspond to when a word of the words 312 was detected since the beginning of the audio input 306. In accordance with at least one embodiment, the speech to text device 308 may communicate with one or more computer systems or cloud systems via available networks (e.g., the Internet) to detect the audio, separate the vocal portion, and transcribe the lyrics 312 and generate time stamps 314 to further generate the time stamped file 310.

In accordance with at least one embodiment, the service provider computer or speech to text device 308 implementing the automated synchronization feature may use speech recognition to transcribe words that correspond to lyrics in the separated vocal audio from the instrumental audio of the audio file 302. In embodiments, the service provider computer or speech to text device 308 may use a machine learning algorithm or neural network to compare the lyrics 312 and time stamps 314 with the separated vocal audio to correct any synchronization errors in an initial determination of the lyrics 312 and time stamps 314 as compared to the playback or actual audio presentation of the audio file 302 as detected by the speech to text device 308. In such cases a third party lyrics file may not be provided or associated with the audio file 302. In embodiments, the service provider computer or speech to text device 308 may generate the lyric file that will be associated with the audio file 302 and used to present synchronized lyrics during simultaneous playback or presentation of the audio file 302. In embodiments, the audio file 302 may include vocal portions that are already separated or distinguished from the instrumental or accompaniment audio of a media file. In embodiments, automatic speech recognition may be utilized to transcribe the individual words (lyrics 312) included in the separated vocal audio of audio file 302. In accordance with at least one embodiment, the automated speech recognition may utilize the separated vocal audio of the audio file 302 represented as $\hat{u}(t)$, from which the system derives a sequence of fixed size acoustic vectors ($U_{1:T} = u_1, \ldots, u_T$). The service provider computer or speech to text device 308 implementing the automated synchronization feature may determine the most likely sequence of words ($W_{1:M_w} = w_1, \ldots, w_{M_w}$) given the sequence of acoustic vectors. A formula such as:

$$\hat{W} = \arg\max p(U/W; \Theta_{AM})^{1/k} p(W; \Theta_{LM}), W \text{ AM LR}$$

where $\Theta_{AM}$ and $\Theta_{LM}$ are the free parameters of the acoustic and language model, and k balances the impact of the acoustic model against the language model may be used by the service provider computers or speech to text device 308 to find the most likely sequence of words while transcribing the lyrics 312 included in the separated vocal audio of audio file 302. An acoustic model using bidirectional LSTM with 5 layers, 35 M parameters, and 32-dimensional log-filterbank energies may be used as input features. The language model may be a 4-gram statistical model.

Figure 4:
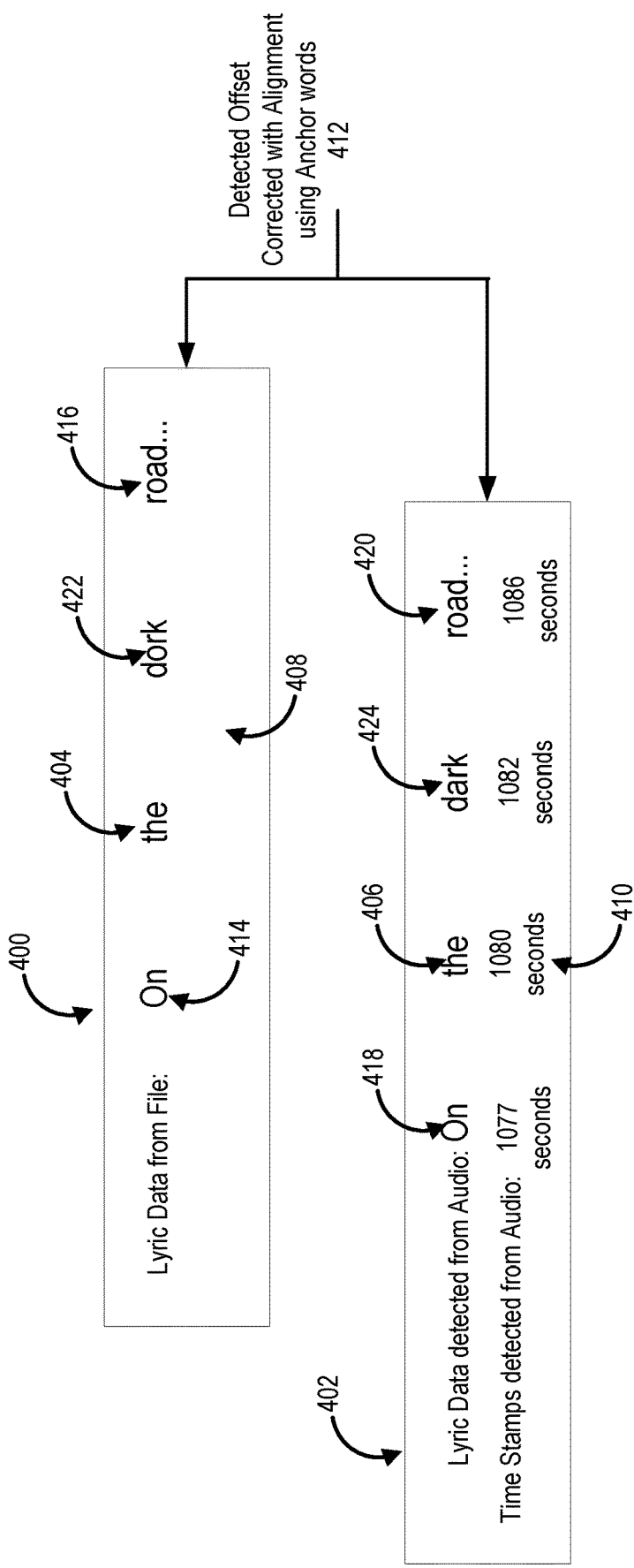
FIG. 4 illustrates an example of a detected offset for an automated synchronization feature, in accordance with at least one embodiment.

FIG. 4 illustrates an example of a detected offset for an automated synchronization feature, in accordance with at least one embodiment. FIG. 4 includes a lyric file 400 and a generated file 402 as well as associated lyrics 404 and 406. As described herein, lyric files such as lyric file 400 provided by other entities such as a third party may not include time stamps 408. However, the generated file 402 does include time stamps 410 that correspond to the lyrics 406 as detected using speech recognition. In embodiments, the lyric file 400 may be provided by a third party and include lyrics 404 that correspond to the words included in the vocal portion of a media file (e.g., "On the dark road . . . "). In embodiments, the automated synchronization features described herein may utilize a lyric file (e.g., lyric file 400) and the corresponding data included in a lyric file whether it include synchronized or unsynchronized lyrics as well as time stamps to identify and correct synchronization errors between said lyric file and an associated media file.

The generated file 402 may include lyrics 406 that are transcribed from a separated vocal portion of the media file as described herein and in more detail with reference to FIG. 2. In embodiments, each word that comprises the lyrics 406 are transcribed using speech recognition or speech recognition algorithms implemented by the service provider computer that utilize the vocal portions of an audio file or media file to detect and transcribe the words that comprise the lyrics as well as generate a time stamp (e.g., time stamps 410). The time stamps 410 correspond to a detection by the speech recognition algorithm of the utterance of each word that comprises the lyrics 406. In accordance with at least one embodiment, the generated file may include one or more data objects for each detected word detected by the speech recognition. Each data object may include a start time that corresponds to when the utterance of the word is detected, an end time that corresponds to when the utterance of the word is no longer detected, a transcription of the detected word, a value that represents a confidence in the transcription of the detected word, and a type of word such as a pronunciation. In embodiments, the service provider computer implementing the automated synchronization feature may flag or tag certain words which is also indicated in the data object of the generated file for further inspection or correction by an operator.

The service provider computer may utilize a threshold to compare the value of confidence in the transcription to flag or tag a transcribed word for further operator review such as when the value falls below a certain threshold indicating that the speech recognition may not have transcribed or understood the word uttered at the corresponding time stamp. FIG. 4 also includes a depiction of a detected offset 412 that represents the offset between the lyric file 400 and the generated file 402. As described herein, due to different transcriptions, versions, or other factors the audio playback of an audio portion of a media file or vocal portion of a medial file may introduce desynchronization errors with an associated lyric file such as lyric file 400. When this occurs an unmodified or uncorrected lyric file that is presented simultaneously or used simultaneously with a media file may result in words that correspond to the lyrics being presented incorrectly or at such a latency that a user is unable to utilize or understand the words as visually presented with the words that are being audibly presented by a device. In embodiments, the service provider computer may compare the lyric file 400 and generated file 402 to identify language or text errors as well as the time stamps to identify an offset.

As illustrated in FIG. 4, the detected offset 412 may correspond to some delay between when the lyrics 404 of the lyric file 400 are presented when compared to the audio detection of the vocal portion of a media file as represented by the lyrics 406 of generated file 402 and the corresponding time stamps. In embodiments, the service provider computer may correct or resolve the synchronization error between the lyric file 400 and the generated file 402 by aligning the words in the lyric file 400 to the words in the generated file 402 (e.g., the lyrics 404 with the lyrics 406). In accordance with at least one embodiment, the detected offset 412 may be corrected by using a matching algorithm that aligns the lyrics 404 from the lyric file 400 with the lyrics 406 of the generated file. An example matching algorithm may use anchor words such as anchor words 414 and 416 as well as 418 and 420. By aligning the lyrics 404 of the lyric file 400 with the lyrics 406 of the generated file 402 the service provider computer applies an offset to the lyric file such that the lyric file 400 when presented simultaneously with the corresponding media file will be synchronized with the audio presentation of the vocal portions of the media file. Another example matching algorithm utilized by the service provider computer may include an N-gram algorithm that utilizes a certain number of matched words between the lyrics 404 and lyrics 406 to align the lyric file 400 with the generated file 402 and thereby introduce an offset that corrects detected offsets 412 or non-synchronization between the lyric file 400 and an associated media file. In embodiments, the service provider computer may also utilize a matching algorithm that looks for one or more words included in the lyrics 404 and 406 to align the lyric file 400 and generated file 402. For example, the words may include the first and last word of each lyric file 400 or the first and last word of each lyric line included in the lyric file 400.

Anchor words used in a matching algorithm may include the first and last word of each lyric file 400 or the first and last word of each lyric line included in the lyric file 400. As described herein and as illustrated in FIG. 4, the automated synchronization features may be utilized to identify and correct language or text errors that occur during transcription or that are included in a provided or otherwise obtained file such as lyric file 400. At 422 the lyric "dork" is included in the lyric file 400 whereas in the word 424 detected using the automated synchronization feature identified "dark" in in the generated file 402. In embodiments, the service provider computer implementing the features described herein may modify or otherwise alter the word 422 to change from "dork" to "dark" and thereby correct any language or transcription errors included in the lyric file 400. In accordance with at least one embodiment, a machine learning algorithm may be configured to align or otherwise correct time stamps between a lyric file (lyric file 400) and a generated file (generated file 402) using a sequence model such as LSTM or an attention model. The machine learning algorithm may be configured to identify certain words with specific phonetics that are difficult to apply time stamps to and therefore could learn to identify nearby words or rely on learned statistical models to correct offsets for certain words.

Figure 5:
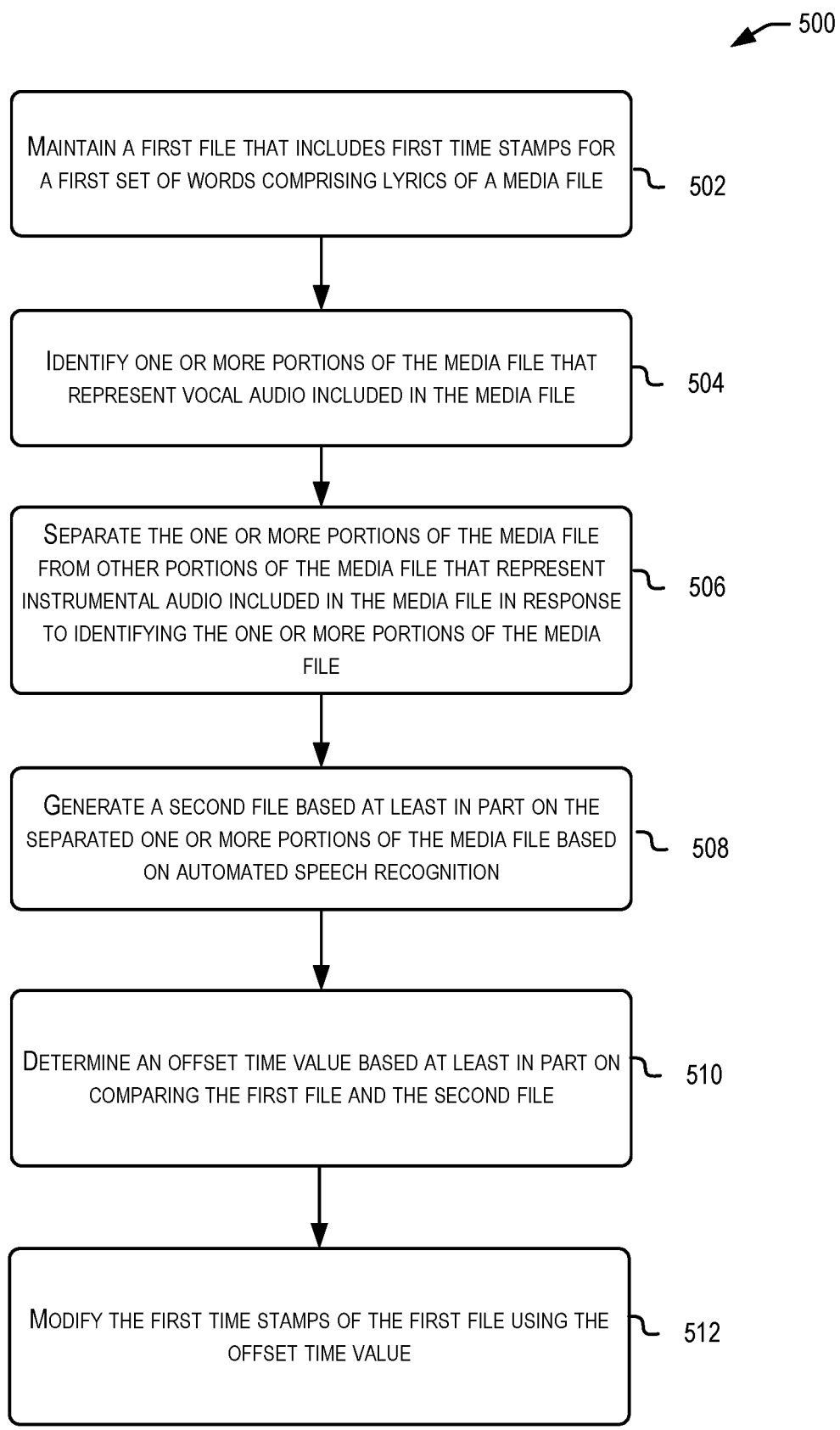
FIG. 5 illustrates a flow diagram for an automated synchronization feature, in accordance with at least one embodiment.
Figure 6:
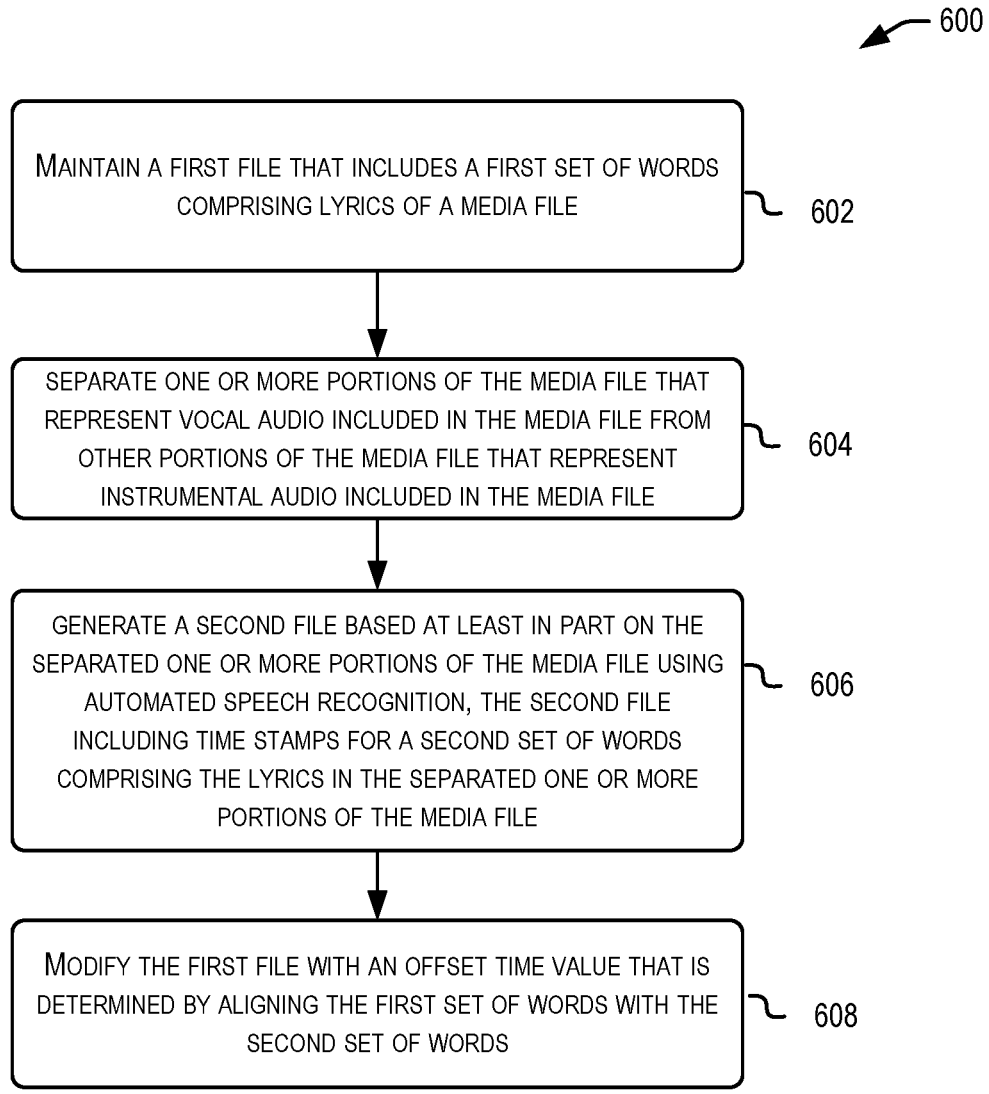
FIG. 6 illustrates a flow diagram for an automated synchronization feature, in accordance with at least one embodiment.

FIGS. 5 and 6 illustrate example flow charts for an automated synchronization features, according to embodiments. These processes are illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer executable instructions include routines, programs, objects, components, data structures, and the like that perform particular functions or implement particular data types. The order in which the operations are described is not intended to be construed as a limitation, and any number of the descried operations can be combined in any order and/or in parallel to implement the process.

Additionally, some, any, or all of the process (or any other processes described herein, or variations and/or combination thereof) may be performed under the control of one or more computer systems configured with executable instructions and may be implemented as code (e.g., executable instructions, one or more computer programs or one or more applications) executing collectively on one or more processors, by hardware or combinations thereof. AS noted above, the code may be stored on a computer-readable storage medium, for example, in the form of a computer program including a plurality of instructions executable by one or more processors. The computer-readable storage medium may be non-transitory.

Figure 7:
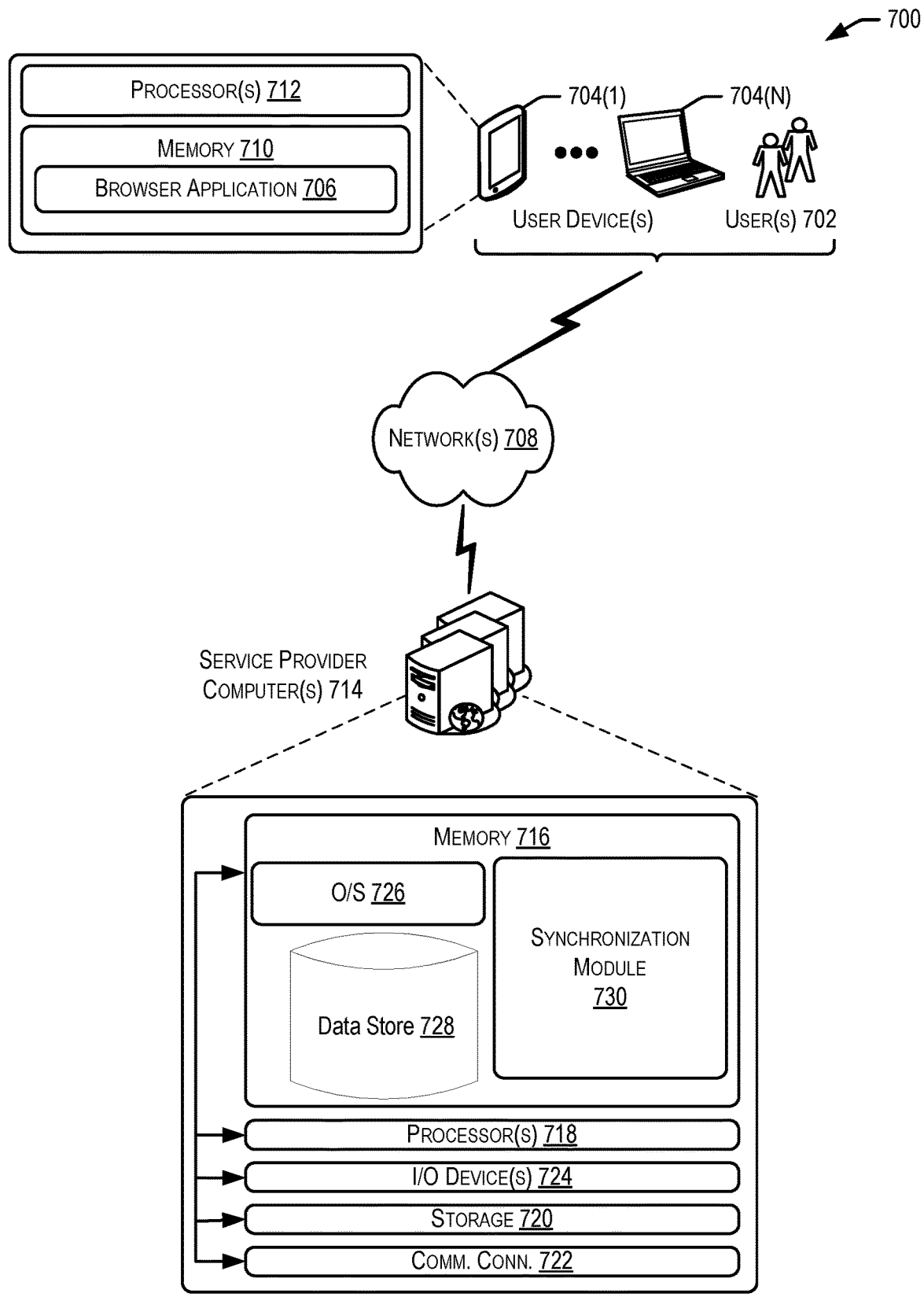
FIG. 7 illustrates an example architecture for implementing an automated synchronization feature, in accordance with at least one embodiment.

In some examples, the service provider computers (service provider computers 714) utilizing at least the synchronization module 730 depicted in FIG. 7 may perform the processes 500 and 600 of FIGS. 5 and 6. In FIG. 5, the process 500 may include maintaining a first file that includes first time stamps for a first set of words comprising lyrics of a media file at 502. Time stamps may refer to time periods for a beginning and ending of an utterance of a word in a media file. The process 500 may include identifying one or more portions of the media file that represent vocal audio included in the media file at 504. In embodiments the process 500 may include separating the one or more portions of the media file from other portions of the media file that represent instrumental audio included in the media file in response to identifying the one or more portions of the media file at 506. In embodiments, identifying and separating the one or more portions of the media file from the other portions of the media file that represents instrumental audio does not include changing the length or duration of the media or audio file. The generated file that is utilized to compare with a lyric file as described herein may be of the same duration but the generated file may include only the vocal portions of the audio or media file without the overlaid other portions of the audio or media file such as the instrumental or accompaniment portions. In accordance with at least one embodiment, the service provider computers may receive or otherwise obtain a file that only includes the vocal portion for a corresponding audio file or media file such that the identification and separation do not need to occur before comparison with the lyric file to identify synchronization errors.

The process 500 may include generating a second file based at least in part on the separated one or more portions of the media file using an automated speech recognition at 508. The second file may include second time stamps for a second set of words comprising the lyrics in the separated one or more portions of the media file. In accordance with at least one embodiment, the second file may be generated using an associated speech to text device that captures audio corresponding to playback of the separated one or more portions of the media file. In embodiments, the second file may be generated using an automated speech recognition algorithm that identifies words included in the separated one or more portions of the media file as well as generates time stamps for when the words are identified or transcribed in the separated one or more portions of the media file. The process 500 may include determining an offset time value based at least in part on comparing the first file and the second file at 510. In embodiments, determining the offset time value may be performed by comparing the first time stamps of the first file and the second time stamps of the second file. In embodiments, determining the offset time value may include using a mean or median of differences between the first time stamps for the first set of words and the second time stamps for the second set of words. In accordance with at least one embodiment, the automated speech recognition may use an algorithm that may generate a value for each word of the second set of words that represents a confidence in the transcription of that word from the separated one or more portions of the media file. The process 500 may include modifying the first time stamps of the first file using the offset time value at 512. In accordance with at least one embodiment, the service provider computers implementing the automated synchronization feature may be configured to incorporate the offset time value into the first file thereby synchronizing the lyrics or words included in the first file when simultaneously presented or consumed with the audio portion of a media file.

The process 600 of FIG. 6 may include maintaining a first file that includes a first set of words comprising lyrics of a media file at 602. The process 600 may include separating one or more portions of the media file that represent vocal audio included in the media file from other portions of the media file that represent instrumental audio included in the media file at 604. The process 600 may include generating a second file based at least in part on the separated one or more portions of the media file using automated speech recognition where the second file includes time stamps for a second set of words comprising the lyrics in the separated one or more portions of the media file at 606. The process 600 may include modifying the first file with an offset time value that is determined by aligning the first set of words with the second set of words. In accordance with at least one embodiment, aligning the first set of words with the second set of words may be performed by aligning a certain portion of words in both sets of words using an N-gram algorithm such as a 3-gram algorithm.

In accordance with at least one embodiment, separating the one or more portions of the media file that correspond to vocal audio from other portions that correspond to instrumental audio is based at least in part on first frequencies associated with the vocal audio and second frequencies associated with the instrumental audio. In embodiments, a value for the N-gram algorithm may be specified by an entity associated with streaming the media file. For example, an operator associated with the service provider computers implementing the automated synchronization feature and streaming the media file may specify a 3-gram algorithm or match be performed between files to align the files and apply an offset such that playback of the lyrics file with the media file simultaneously would result in a synchronized presentation of lyrics that correspond to the presented audio included in the media file. In some embodiments, aligning the lyrics between the files occurs using the first and last words of each file (first file and second file). In embodiments, an algorithm may identify and align the first and last words of each file (first file and second file). In accordance with at least one embodiment, the service provider computers implementing the automated synchronization feature may be configured to identify errors between the first file (third party provided) and the second file (generated by the service provider computer using automated speech recognition algorithms) such as missing words, typos, or incorrect words. In embodiments, a confidence value of a detected word in the second file may be compared to a threshold and based on such a comparison the service provider computers may transmit the second file to an operator for manual review and correction of a potential error or de-synchronization between the first file and second file. In embodiments, separating the one or more portions of the media file that represent the vocal audio included in the media file from the other portions of the media file (instrumental audio) includes using one or more acoustic models or one or more language models. In embodiments, language models may refer to different models that each correspond to a different spoken language (e.g., a language model for English, a language model for Spanish, etc.).

FIG. 7 illustrates an example architecture for implementing an automated synchronization feature, in accordance with at least one embodiment. In architecture 700, one or more users 702 (e.g., customers, users, consumers, etc.) may utilize user computing devices 704(1)-(N) (collectively, user devices 704) to access a browser application 706 or a user interface (UI) accessible through the browser application 706, via one or more networks 708 to request content including media content such as music, movies, films, TV shows, or streaming content (media content). The "browser application" 706 can be any browser control or native application that can access and display a network page or other information such as a user interface of a native software application for enabling the selection or interaction of content. A native software application may include an application or program that has been developed for use on a particular platform (such as an operating system) or a particular device (such as a particular type of mobile device or user device 704). In embodiments, the user device 704 may include one or more components for enabling the user 702 to interact with the browser application 706.

The user devices 704 may include at least one memory 710 and one or more processing units or processor(s) 712. The memory 710 may store program instructions that are loadable and executable on the processor(s) 712, as well as data generated during the execution of these programs. Depending on the configuration and type of the user devices 704, the memory 710 may be volatile (such as random access memory (RAM)) and/or non-volatile (such as read-only memory (ROM), flash memory, etc.). The user devices 704 may also include additional removable storage and/or non-removable storage including, but not limited to, magnetic storage, optical disks, and/or tape storage. The disk drives and their associated non-transitory computer-readable media may provide non-volatile storage of computer-readable instructions, data structures, program modules, and other data for the user devices 704. In some implementations, the memory 710 may include multiple different types of memory, such as static random access memory (SRAM), dynamic random access memory (DRAM), or ROM.

Turning to the contents of the memory 710 in more detail, the memory 710 may include an operating system and one or more application programs or services for implementing the features disclosed herein. Additionally, the memory 710 may include one or more modules for implementing the features described herein including a synchronization module 730.

The architecture 700 may also include one or more service provider computers 714 that may, in some examples, provide computing resources such as, but not limited to, client entities, low latency data storage, durable data store, data access, management, virtualization, hosted computing environment or "cloud-based" solutions, electronic content performance management, etc. The service provider computers 714 may implement or be an example of the service provider computer(s) described herein with reference to FIGS. 1-4 and throughout the disclosure. The one or more service provider computers 714 may also be operable to provide site hosting, computer application development, and/or implementation platforms, combinations of the foregoing, or the like to the one or more users 702 via user devices 704.

In some examples, the networks 708 may include any one or a combination of many different types of networks, such as cable networks, the Internet, wireless networks, cellular networks, and other private and/or public networks. While the illustrated examples represents the users 702 communicating with the service provider computers 714 over the networks 708, the described techniques may equally apply in instances where the users 702 interact with the one or more service provider computers 714 via the one or more user devices 704 over a landline phone, via a kiosk, or in any other manner. It is also noted that the described techniques may apply in other client/server arrangements (e.g., set-top boxes, etc.), as well as in non-client/server arrangements (e.g., locally stored applications, peer-to-peer arrangements, etc.).

The one or more service provider computers 714 may be any type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the one or more service provider computers 714 may be executed by one or more virtual machines implemented in a hosted computing environment. The hosted computing environment may include one or more rapidly provisioned and released computing resources, which computing resources may include computing, networking, and/or storage devices. A hosted computing environment may also be referred to as a cloud computing environment or distributed computing environment. In some examples, the one or more service provider computers 714 may be in communication with the user device 704 via the networks 708, or via other network connections. The one or more service provider computers 714 may include one or more servers, perhaps arranged in a cluster or as individual servers not associated with one another.

In one illustrative configuration, the one or more service provider computers 714 may include at least one memory 716 and one or more processing units or processor(s) 718. The processor(s) 718 may be implemented as appropriate in hardware, computer-executable instructions, firmware, or combination thereof. Computer-executable instruction or firmware implementations of the processor(s) 718 may include computer-executable or machine-executable instructions written in any suitable programming language to perform the various functions described when executed by a hardware computing device, such as a processor. The memory 716 may store program instructions that are loadable and executable on the processor(s) 718, as well as data generated during the execution of these programs. Depending on the configuration and type of the one or more service provider computers 714, the memory 716 may be volatile (such as RAM) and/or non-volatile (such as ROM, flash memory, etc.). The one or more service provider computers 714 or servers may also include additional storage 720, which may include removable storage and/or non-removable storage. The additional storage 720 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 716 may include multiple different types of memory, such as SRAM, DRAM, or ROM.

The memory 716, the additional storage 720, both removable and non-removable, are all examples of non-transitory computer-readable storage media. For example, computer-readable storage media may include volatile or non-volatile, removable or non-removable media implemented in any method or technology for storage of information such as computer-readable instructions, data structures, program modules, or other data. The memory 716 and the additional storage 720 are all examples of non-transitory computer storage media. Additional types of non-transitory computer storage media that may be present in the one or more service provider computers 714 may include, but are not limited to, PRAM, SRAM, DRAM, RAM, ROM, EEPROM, flash memory or other memory technology, CD-ROM, DVD, or other optical storage, magnetic cassettes, magnetic tape, magnetic disk storage or other magnetic storage devices, or any other medium which can be used to store the desired information and which can be accessed by the one or more service provider computers 714. Combinations of any of the above should also be included within the scope of non-transitory computer-readable media.

The one or more service provider computers 714 may also contain communication connection interface(s) 722 that allow the one or more service provider computers 714 to communicate with a data store, another computing device or server, user terminals, and/or other devices on the networks 708. The one or more service provider computers 714 may also include I/O device(s) 724, such as a keyboard, a mouse, a pen, a voice input device, a touch input device, a display, speakers, a printer, etc.

Turning to the contents of the memory 716 in more detail, the memory 716 may include an operating system 726, one or more data stores 728, and/or one or more application programs or services for implementing the features disclosed herein including the synchronization module 730. In accordance with at least one embodiment, the synchronization module 730 may be configured to at least analyze audio data captured by a speech to text device, detect vocal portions of a media file, separate the vocal portions of a media file from the instrumental portions of the media file, transcribe the words or lyrics in the vocal portions of the media file to generate a file that includes the transcribed words included in the vocal portions as well as time stamps for each transcribed word (e.g., a start time and end time for each word). In embodiments, the synchronization module 730 may be configured to identify synchronization errors between the generated file and a lyrics file provided by a third party or other entity for a media file. Identifying synchronization errors may include determining differences between time stamps for words comprising the lyrics of a media file when comparing the files. The synchronization module 730 may be configured to determine an offset time value (e.g., a period of time to offset time stamps for a file) that can be incorporated into a file such as the lyrics file provided by a third party to synchronize the audio presentation of media content with lyrics presentation of the media content. The synchronization module 730 may be configured to identify other errors when comparing files such as errors in the transcription or composition of words included in a lyrics file such as identifying missing words, incorrect words, or typos. The synchronization module 730 may be configured to synchronize lyric files that are presented as synchronized but do not have time stamps and when analyzed are not synchronized to the audio presentation of media content as well as generate transcription of lyrics and time stamps for correcting unsynchronized lyric files (e.g., files that include an attempt at transcription of the words but do not include any time stamp information to aid synchronized playback of the lyric file and audio content). In accordance with at least one embodiment, the service provider computers 714 and synchronization module 730 may be configured to stream or otherwise present media content and synchronized lyrics for the media content, via networks 708, to user devices 704 and users 702.

Figure 8:
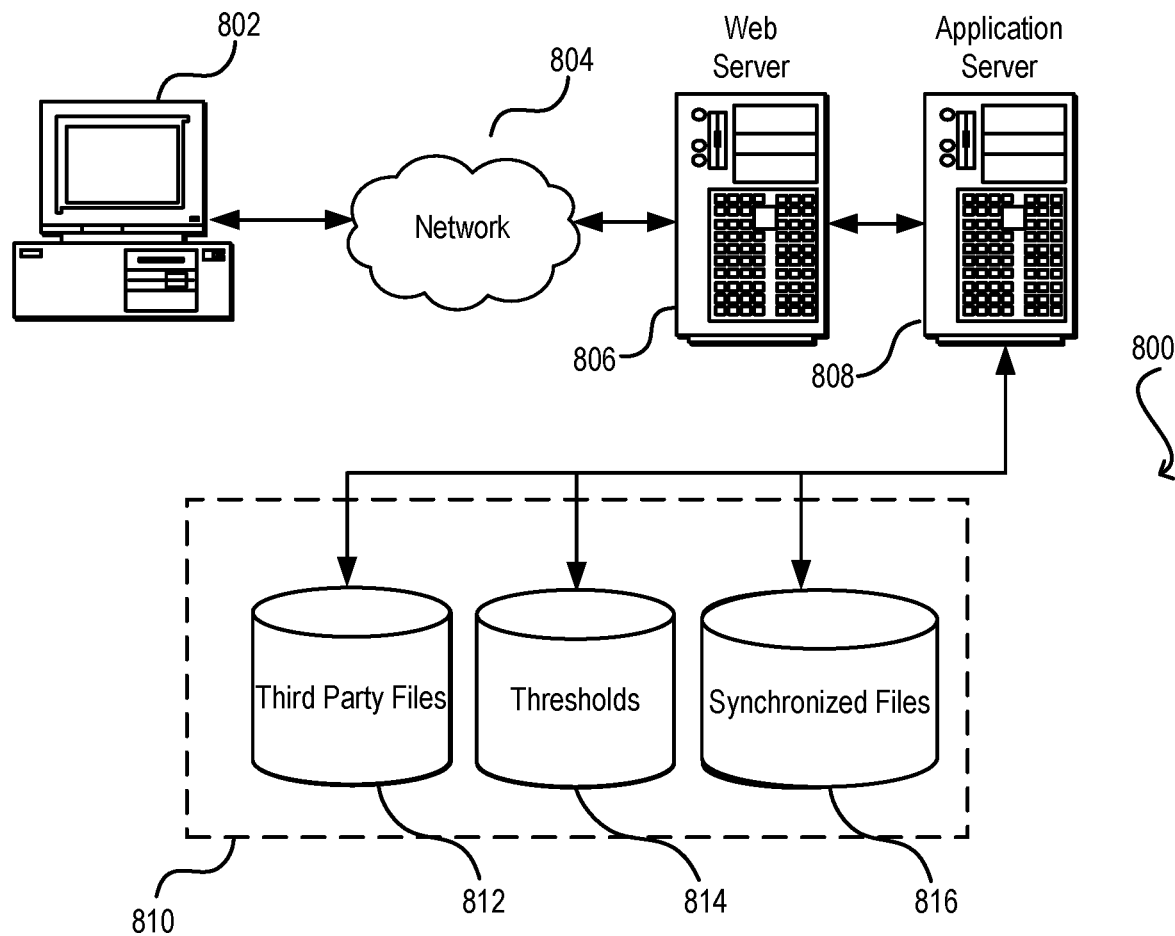
FIG. 8 illustrates an environment in which various embodiments can be implemented.

FIG. 8 illustrates aspects of an example environment 800 for implementing aspects in accordance with various embodiments. As will be appreciated, although a Web-based environment is used for purposes of explanation, different environments may be used, as appropriate, to implement various embodiments. The environment includes an electronic client device 802, which can include any appropriate device operable to send and receive requests, messages, or information over an appropriate network 804 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 802 and the application server 808, can be handled by the Web server. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing third party files 812 and synchronized files 816, which can be used to identify time periods with which to offset a lyrics file to synchronize the audio and lyrics presented for the corresponding audio, generate time stamps for a corresponding lyrics file to present a synchronized lyrics and audio pair, to synchronize a non-synchronized file for a media file that is provided by a third party, or to identify errors in detected audio files or lyric files (e.g., typos or missing words). The data store also is shown to include a mechanism for storing thresholds 814, which can be used for identifying when a file including lyrics and time stamps should be provided to an operator for manual review and correction, or for determining when an offset should be applied (e.g., if the identified offset between an audible detection of a word and the presentation of the lyric for the word is below a threshold, don't apply the offset otherwise do apply the offset). It should be understood that there can be many other aspects that may need to be stored in the data store, such as for page image information and to access right information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 802. Information for a particular item of interest can be viewed in a dedicated page or window of the browser. In one example, a user may request to stream or otherwise consume a media file including an audio file and be presented with synchronized lyrics that correspond to the words including in the media file.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java©, C, C#, or C++, or any scripting language, such as Perl, Python, or TCL, as well as combinations thereof. The server(s) may also include database servers, including without limitation those commercially available from Oracle©, Microsoft*, Sybase*, and IBM©.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
receiving, by a computer system, a media file including vocal audio and instrumental audio;
maintaining, by the computer system, a first file that includes first time stamps for a first set of words comprising lyrics of the media file;
identifying, by the computer system, one or more portions of the media file that represent the vocal audio included in the media file;
in response to identifying the one or more portions of the media file, separating, by the computer system, the one or more portions of the media file from other portions of the media file that represent the instrumental audio included in the media file;
generating, by the computer system, a second file based at least in part on the separated one or more portions of the media file using automated speech recognition, the second file including second time stamps for a second set of words comprising the lyrics in the separated one or more portions of the media file, the second time stamps being different from the first time stamps;
determining, by the computer system, an offset time value based at least in part on comparing the first time stamps of the first file and the second time stamps of the second file;
modifying, by the computer system, the first file by updating the first time stamps of the first file using the offset time value;
identifying, by the computer system, missing words in the first set of words based at least in part on a comparison of the first set of words with the second set of words and
modifying, by the computer system, the first file to include the missing words.

2. The computer-implemented method of claim 1, wherein determining the offset time value includes using a mean or median of differences between the first time stamps for the first set of words and the second time stamps for the second set of words.

3. The computer-implemented method of claim 1, wherein the automated speech recognition includes using an algorithm that generates a value that represents a confidence for each word identified in the second set of words.

4. The computer-implemented method of claim 1, wherein generating the second file includes using an associated speech to text device that captures audio corresponding to playback of the separated one or more portions of the media file, the speech to text device configured to use the automated speech recognition.

5. A non-transitory computer-readable storage medium storing computer-executable instructions that, when executed by a computer system, configure the computer system to perform operations comprising:
obtaining, by a computer system, a media file including vocal audio and instrumental audio;
maintaining, by the computer system, a first file that includes first time stamps for a first set of words comprising lyrics of the media file;
separating, by the computer system, one or more portions of the media file that represent the vocal audio included in the media file from other portions of the media file that represent the instrumental audio included in the media file;
generating, by the computer system, a second file based at least in part on the separated one or more portions of the media file using automated speech recognition, the second file including second time stamps for a second set of words comprising the lyrics in the separated one or more portions of the media file, the second time stamps being different from the first time stamps;
modifying, by the computer system, the first file with an offset time value that is determined by aligning the first set of words with the second set of words;
identifying, by the computer system, missing words in the first set of words based at least in part on a comparison of the first set of words with the second set of words; and
modifying, by the computer system, the first set of words of the first file to include the missing words.

6. A non-transitory computer-readable storage medium of claim 5, wherein separating the one or more portions from the other portions is based at least in part on first frequencies associated with the vocal audio and second frequencies associated with the instrumental audio.

7. A non-transitory computer-readable storage medium of claim 5, wherein aligning the first set of words with the second set of words is performed using a matching algorithm that includes N-gram matches, wherein a value for the N-gram is specified by an entity associated with streaming the media file.

8. A non-transitory computer-readable storage medium of claim 5, wherein aligning the first set of words with the second set of words comprises using a first word and a last word of the first set of words and the second set of words.

9. A non-transitory computer-readable storage medium of claim 5, wherein the operations further comprise:
identifying a typographical error in a word in the first set of words based at least in part on the comparison of the first set of words with the second set of words; and
modifying the first set of words to correct the typographical error.

10. A non-transitory computer-readable storage medium of claim 5, wherein the automated speech recognition includes using an algorithm that generates a value that represents a confidence of a detected word in the separated one or more portions of the media file and wherein operations further comprise transmitting the first file to an operator for correction based at least in part on the value and a threshold.

11. A non-transitory computer-readable storage medium of claim 5, wherein modifying the first file with the offset time value is performed when the offset time value is above a threshold time value.

12. A non-transitory computer-readable storage medium of claim 5, wherein separating the one or more portions of the media file that represent the vocal audio included in the media file from the other portions of the media file includes using one or more acoustic models.

13. A non-transitory computer-readable storage medium of claim 5, wherein separating the one or more portions of the media file that represent the vocal audio included in the media file from the other portions of the media file includes using one or more language models.

14. A computer system comprising:
a memory configured to store computer-executable instructions; and
a processor in communication with the memory configured to execute the computer-executable instructions to at least:
obtain a media file including vocal audio and instrumental audio;
maintain a first file that includes first time stamps for a first set of words comprising lyrics of the media file;
separate one or more portions of the media file that represent the vocal audio included in the media file from other portions of the media file that represent the instrumental audio included in the media file;
generate a second file based at least in part on the separated one or more portions of the media file using automated speech recognition, the second file including second time stamps for a second set of words comprising the lyrics in the separated one or more portions of the media file, the second time stamps being different from the first time stamps;
modify the first file with an offset time value that is determined by aligning the first set of words with the second set of words;
identify missing words in the first set of words based at least in part on a comparison of the first set of words with the second set of words; and
modify the first set of words of the first file to include the missing words.

15. The computer system of claim 14, wherein separating the one or more portions from the other portions is based at least in part on first frequencies associated with the vocal audio and second frequencies associated with the instrumental audio.

16. The computer system of claim 14, wherein aligning the first set of words with the second set of words is performed using a matching algorithm that includes N-gram matches, wherein a value for the N-gram is specified by an entity associated with streaming the media file.

17. The computer system of claim 14, wherein aligning the first set of words with the second set of words comprises using a first word and a last word of the first set of words and the second set of words.

* * * * *